(12) United States Patent
Locke

(10) Patent No.: US 9,317,691 B2
(45) Date of Patent: Apr. 19, 2016

(54) PRE-BOOT SOFTWARE VERIFICATION

(71) Applicant: Kevin B. Locke, Austin, TX (US)

(72) Inventor: Kevin B. Locke, Austin, TX (US)

(73) Assignee: Dell Products L.P., Round Rock, TX (US)

(*) Notice: Subject to any disclaimer, the term of this patent is extended or adjusted under 35 U.S.C. 154(b) by 168 days.

(21) Appl. No.: 14/273,173

(22) Filed: May 8, 2014

(65) Prior Publication Data
US 2015/0324588 A1 Nov. 12, 2015

(51) Int. Cl.
*G06F 21/57* (2013.01)
*G06F 21/56* (2013.01)

(52) U.S. Cl.
CPC .......... *G06F 21/575* (2013.01); *G06F 21/562* (2013.01); *G06F 2221/033* (2013.01)

(58) Field of Classification Search
CPC .................. G06F 21/562; G06F 21/575
See application file for complete search history.

(56) References Cited

U.S. PATENT DOCUMENTS

| | | | | |
|---|---|---|---|---|
| 2004/0030877 A1* | 2/2004 | Frid | ................ | G06F 8/665 713/1 |
| 2013/0263205 A1* | 10/2013 | Jacobs | ................ | G06F 21/57 726/1 |
| 2014/0115314 A1* | 4/2014 | Huang | ................ | G06F 9/4401 713/2 |

* cited by examiner

Primary Examiner — Albert Wang
(74) Attorney, Agent, or Firm — Baker Botts L.L.P.

(57) ABSTRACT

Methods and systems for implementing pre-boot software verification may involve using an embedded controller (EC) and a basic input/output system (BIOS) to confirm each other's firmware using hash values. The hash values may be generated from certain portions of the firmware, which may overlap and may be specific to a particular firmware version.

20 Claims, 3 Drawing Sheets

PRE-BOOT SOFTWARE VERIFICATION

BACKGROUND

1. Field of the Disclosure

This disclosure relates generally to information handling systems and more particularly to pre-boot software verification.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain information handling systems, a basic/input output system (BIOS) and an embedded controller (EC) may include respective firmware for various hardware management tasks. Both the BIOS firmware and/or the EC firmware may be subject to malicious attacks, such as hacking, that compromise the security of an information handling system.

SUMMARY

In one aspect, a disclosed method includes sending, by a basic/input output system (BIOS) firmware included in an information handling system, a first request for a first hash value. Responsive to receiving the first request, the method may include computing, by an embedded controller (EC) firmware included in the information handling system, the first hash value, and sending, by the EC firmware, the first hash value to the BIOS firmware. When the BIOS firmware determines that the first hash value matches a first reference hash value, the method may include sending, by the BIOS firmware, a first confirmation to the EC firmware that the first hash value is accepted. Responsive to receiving the first confirmation, the method may further include sending, by the EC firmware, a second request for a second hash value. Responsive to receiving the second request, the method may also include computing, by the BIOS firmware, the second hash value, and sending, by the BIOS firmware, the second hash value to the EC firmware. When the EC firmware determines that the second hash value matches a second reference hash value, the method may include sending, by the EC firmware, a second confirmation to the BIOS firmware that the second hash value is accepted.

Other disclosed aspects include article of manufacture comprising a non-transitory computer-readable medium storing instructions executable by a processor and a second processor, and the information handling system comprising a processor and a second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
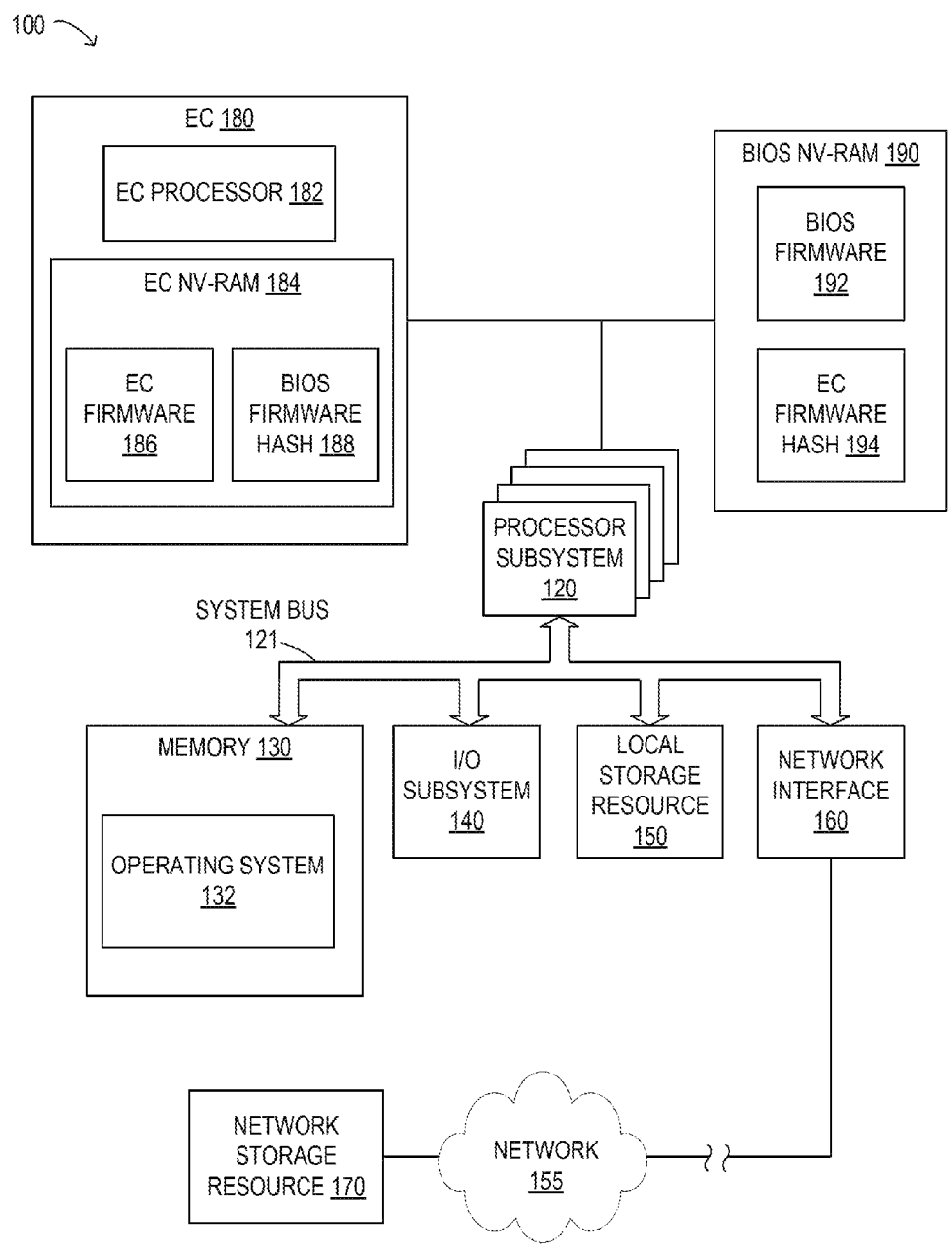
FIG. 1 is a block diagram of selected elements of an embodiment of an information handling system for pre-boot software verification.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, certain information handling systems may include BIOS firmware and embedded controller (EC) firmware, which may be subject to hacking and/or malicious attacks that may compromise security of an information handling systems. For example, a hacked BIOS firmware and/or EC firmware may result in control of an information handling system being overtaken by a malicious entity for malicious purposes. One method of securing firmware, which is stored as digital data, is by calculating a hash value of the firmware and comparing the hash value to a known reference hash value. When the calculated hash value matches the reference hash value, the integrity of the firmware may be confirmed as being intact and the firmware may be safely executed. However, when the BIOS firmware itself is used to calculate a hash value of the BIOS firmware, a high vulnerability to hacking may still exist, because the hash value may be evident to a hacker hacking the BIOS firmware. A similarly high vulnerability may exist when EC firmware is itself used to calculate a hash value of the EC firmware for security purposes.

As will be described in further detail, the inventors of the present disclosure have discovered a method and system for pre-boot software verification for information handling systems that include BIOS firmware and EC firmware. The BIOS firmware is used to calculate a hash value of the EC firmware, while the EC firmware is used to calculate a hash value for the BIOS firmware. Additionally, the methods described herein my divide firmware into arbitrary and/or overlapping memory ranges (for storing the firmware digital data), and repeat calculations of hash values for the respective memory ranges until the entire firmware has been checked. The actual memory ranges and corresponding hash values may be changed when different versions of the firmware are released to further decrease vulnerability to hacking. In this manner, both BIOS firmware and EC firmware may be effectively subject to pre-boot software verification.

Figure 2:
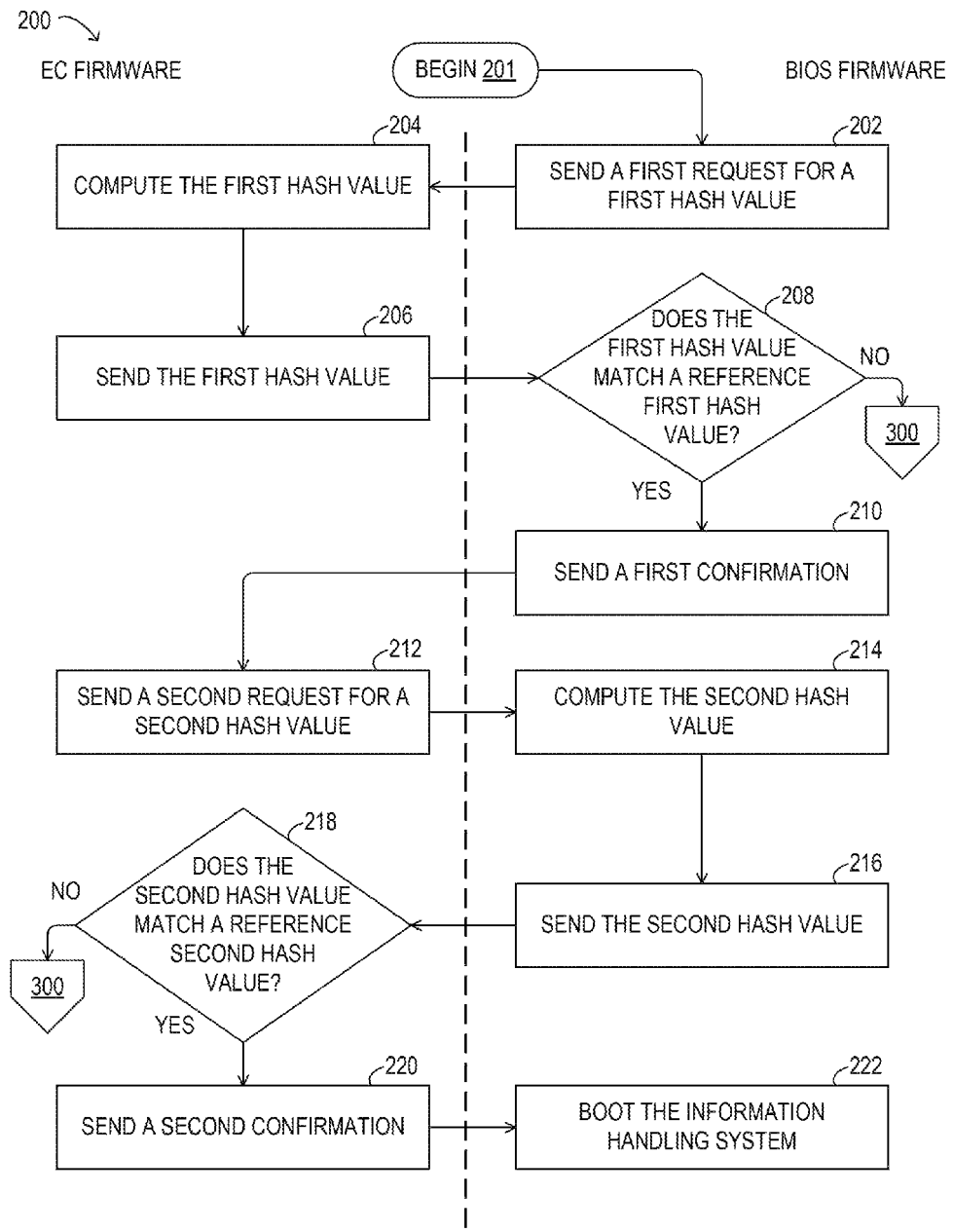
FIG. 2 is a flowchart depicting selected elements of an embodiment of a method for pre-boot software verification.
Figure 3:
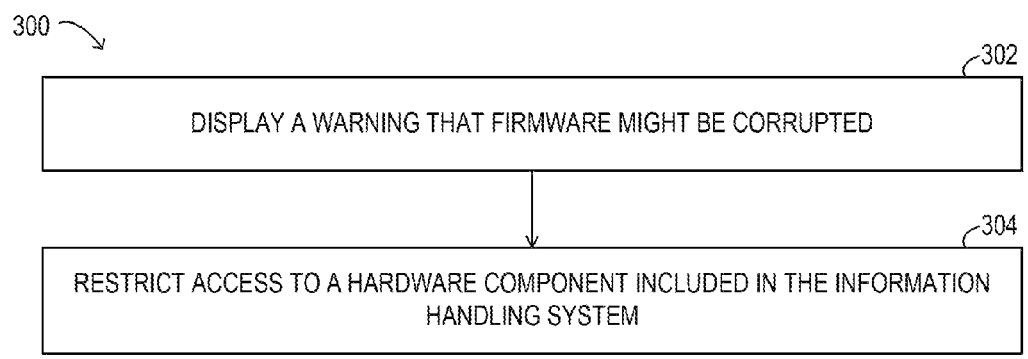
FIG. 3 is a flowchart depicting selected elements of an embodiment of a method for pre-boot software verification.

Particular embodiments are best understood by reference to FIGS. 1, 2, and 3 wherein like numbers are used to indicate like and corresponding parts.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as user-personalized wake policy 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 are embedded controller (EC) 180, which may include EC processor 182 as a second processor included with information handling system 100 for certain management tasks. EC processor 182 may have access to EC non-volatile random access memory (NV-RAM), which may store EC firmware 186, representing instructions executable by EC processor 182. Also shown stored in EC NV-RAM 184 is BIOS firmware hash 188, which may represent a reference hash value for a hash of BIOS firmware 192, stored in BIOS NV-RAM 190, often simply or collectively referred to as the 'BIOS'. BIOS firmware 192 may represent pre-boot instructions executable by processor subsystem 120, for example, for preparing information handling system 100 to boot by activating various hardware components in preparation of launching operating system 132 for execution. Also shown stored in BIOS NV-RAM 190 is EC firmware hash 194, which may represent a reference hash value for a hash of EC firmware 186. It is noted that BIOS firmware hash 188 and/or EC firmware hash 194 may be stored as files. In certain embodiments, BIOS firmware hash 188 and/or EC firmware hash 194 may be stored remotely (not shown), such as in network storage resource 170.

In operation, when information handling system 100 is powered on, EC firmware 186 and BIOS firmware 192 may be launched and may execute. As referred to herein, BIOS firmware 192 may represent first instructions executing on processor subsystem 120, while EC firmware 186 may represent second instructions executing on EC processor 182. It is noted that other processors and/or processor subsystems (not shown) may be used to execute EC firmware 186 and/or BIOS firmware 192 in various embodiments. Since EC 180 and BIOS NV-RAM 190 are coupled in information handling system 100, EC firmware 186 and BIOS firmware 192 may communicate with each other.

Then, pre-boot software verification of EC firmware 186 and BIOS firmware 192 may be performed in tandem by EC firmware 186 and BIOS firmware 192. Specifically, BIOS firmware 192 may request EC firmware 186 for a first hash value of EC firmware 186 (stored as digital data). EC firmware 186 may then calculate the first hash value and send the first hash value to BIOS firmware 192. BIOS firmware 192 may receive the calculated first hash value and compare the calculated first hash value with EC firmware hash 194. When the calculated first hash value matches EC firmware hash 194, BIOS firmware 192 may send a first confirmation to EC firmware 186. Upon receiving the first confirmation, EC firmware 186 may request BIOS firmware 192 for a second hash value of BIOS firmware 192 (stored as digital data). BIOS firmware 192 may calculate the second hash value and send the second hash value to EC firmware 186. EC firmware 186 may receive the calculated second hash value and compare the calculated second hash value with BIOS firmware hash 188. When the calculated second hash value matches BIOS firmware hash 188, EC firmware 186 may send a second confirmation to BIOS firmware 192. Upon receiving the second confirmation, BIOS firmware 192 may proceed to boot information handling system 100, and launch operating system 132, for example.

When the calculated first hash value does not match EC firmware hash 194, BIOS firmware 192 may not send the first confirmation, but instead, may restrict access to certain hardware components in information handling system 100. For example, at least one of the following hardware components and/or elements may be deactivated by BIOS firmware 192: a network interface controller (such as network interface 160), a storage controller, a system bus (such as system bus 121), a memory device (such as memory 130), a storage device (such as local storage resource 150), a camera, and a microphone, among other hardware components. When the calculated second hash value does not match BIOS firmware hash 188, EC firmware 186 may send a corresponding notification to BIOS firmware 192, which may then restrict access to certain hardware components in information handling system 100, as noted above.

It is noted that the pre-boot software verification procedure described above may further divide calculation of firmware hash values into segments or portions, specified by a corresponding memory range. Thus, the first hash value calculation may be repeated for each of the memory ranges, for which a different value corresponding to a different portion of the firmware is specified, for example, in a request. The memory ranges may overlap and/or may cover all of the firmware digital data. In various embodiments, the memory ranges may be modified each time a new version of the corresponding firmware is released. In this manner, hacking of EC firmware 186 and/or BIOS firmware 192 may be made substantially more difficult.

Turning now to FIG. 2, a block diagram of selected elements of an embodiment of method 200 for pre-boot software verification is depicted in flowchart form. Method 200 may be performed using information handling system 100 (see FIG. 1). It is noted that certain operations described in method 200 may be optional or may be rearranged in different embodiments. In FIG. 2, left-side operations in method 200 may be executed by EC firmware 186, while right-side operations may be executed by BIOS firmware 192.

Method 200 may begin (operation 201) by powering up an information handling system and starting EC firmware and BIOS firmware. Then, BIOS firmware may send (operation 202) a first request for a first hash value. The first hash value is for the digital data of the EC firmware itself. EC firmware may receive the first request and may proceed to compute (operation 204) the first hash value. Then, EC firmware may send (operation 206) the first hash value. As noted previously, the first request may specify a memory range of the EC firmware, representing a portion of the EC firmware. The first request may then be repeated (not shown in FIG. 2) for different values of the memory range, until the entire digital data of the EC firmware has been covered. Accordingly, the first hash value may be repeatedly sent, or sent as a plurality of values, corresponding to the different memory ranges. Then, upon receiving the first hash value, a decision may be made by the BIOS firmware whether the first hash value matches (operation 208) a reference first hash value. The reference first hash value may be EC firmware hash 194 (see FIG. 1). When the result of operation 208 is NO method 200 may jump to method 300 (see FIG. 3). When the result of operation 208 is YES, BIOS firmware may send (operation 210) a first confirmation.

In FIG. 2, upon receiving the first confirmation, EC firmware may send (operation 212) a second request for a second hash value. The second hash value is for the digital data of the BIOS firmware itself. BIOS firmware may receive the second request and may proceed to compute (operation 214) the second hash value. Then, BIOS firmware may send (operation 216) the second hash value. As noted previously, the second request may specify a memory range of the BIOS firmware, representing a portion of the BIOS firmware. The second request may then be repeated (not shown in FIG. 2) for different values of the memory range, until the entire digital data of the BIOS firmware has been covered. Accordingly, the second hash value may be repeatedly sent, or sent as a plurality of values, corresponding to the different memory ranges. Then, upon receiving the second hash value, a decision may be made by the EC firmware whether the second hash value matches (operation 218) a reference second hash value. The reference second hash value may be BIOS firmware hash 188 (see FIG. 1). When the result of operation 218 is NO method 200 may jump to method 300 (see FIG. 3). When the result of operation 218 is YES, EC firmware may send (operation 220) a second confirmation. Upon receiving the second confirmation, BIOS firmware may boot (operation 222) the information handling system.

Referring now to FIG. 3, a block diagram of selected elements of an embodiment of method 300 for pre-boot software verification is depicted in flowchart form. Method 300 may be performed using information handling system 100 (see FIG. 1). It is noted that certain operations described in method 300 may be optional or may be rearranged in different embodiments. Method 300 may begin by displaying (operation 302) a warning that firmware might be corrupted. Access to a hardware component included in the information handling system may be restricted (operation 304).

Methods and systems for implementing pre-boot software verification may involve using an embedded controller (EC) and a basic input/output system (BIOS) to confirm each other's firmware using hash values. The hash values may be generated from certain portions of the firmware, which may overlap and may be specific to a particular firmware version.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    sending, by a basic/input output system (BIOS) firmware included in an information handling system, a first request for a first hash value;
    responsive to receiving the first request, computing, by an embedded controller (EC) firmware included in the information handling system, the first hash value;
    sending, by the EC firmware, the first hash value to the BIOS firmware;
    when the BIOS firmware determines that the first hash value matches a first reference hash value, sending, by the BIOS firmware, a first confirmation to the EC firmware that the first hash value is accepted;
    responsive to receiving the first confirmation, sending, by the EC firmware, a second request for a second hash value;
    responsive to receiving the second request, computing, by the BIOS firmware, the second hash value;
    sending, by the BIOS firmware, the second hash value to the EC firmware; and
    when the EC firmware determines that the second hash value matches a second reference hash value, sending, by the EC firmware, a second confirmation to the BIOS firmware that the second hash value is accepted.

2. The method of claim 1, wherein the first request specifies a first memory range associated with the EC firmware for calculating the first hash value, and wherein the second request specifies a second memory range associated with the BIOS firmware for calculating the second hash value.

3. The method of claim 2, wherein the first memory range and the second memory range are unique to both a first version of the EC firmware and a second version of the BIOS firmware.

4. The method of claim 2, further comprising:
    repeating sending, by the BIOS firmware, the first request specifying the first memory range, wherein each repeated first request specifies a different value for the first memory range; and
    repeating sending, by the EC firmware, the second request specifying the second memory range, wherein each repeated second request specifies a different value for the second memory range.

5. The method of claim 4, wherein the first memory range specified by a repeated first request overlaps with the first memory range specified by a previous first request, and wherein the second memory range specified by a repeated second request overlaps with the second memory range specified by a previous second request.

6. The method of claim 1, wherein the first reference hash value is stored in a first file accessible to the BIOS firmware, and wherein the second reference hash value is stored in a second file accessible to the EC firmware.

7. The method of claim 1, wherein the BIOS firmware is stored in a first non-volatile memory, and wherein the EC firmware is stored in a second non-volatile memory.

8. The method of claim 1, further comprising:
    responsive to receiving the second indication, booting the information handling system.

9. The method of claim 1, when the BIOS firmware determines that the first hash value does not match the first reference hash value, or when the EC firmware determines that the second hash value does not match the second reference hash value, further comprising:
    restricting access to a hardware component included in the information handling system.

10. The method of claim 9, wherein the hardware component is selected from at least one of:
    a network interface controller
    a storage controller;
    a system bus;
    a memory device;
    a storage device;
    a camera; and
    a microphone.

11. An information handling system, comprising:
    a processor subsystem having access to a basic/input output system (BIOS) firmware, wherein the BIOS firmware includes first instructions executable by the processor subsystem; and an embedded controller (EC) including a second processor having access to EC firmware, wherein the EC firmware includes second instructions executable by the second processor, wherein the first instructions and the second instructions are executable to:
- send, by the BIOS firmware, a first request for a first hash value;
- responsive to receiving the first request, compute, by the EC firmware, the first hash value;
- send, by the EC firmware, the first hash value to the BIOS firmware;
- when the BIOS firmware determines that the first hash value matches a first reference hash value, send, by the BIOS firmware, a first confirmation to the EC firmware that the first hash value is accepted;
- responsive to receiving the first confirmation, send, by the EC firmware, a second request for a second hash value;
- responsive to receiving the second request, compute, by the BIOS firmware, the second hash value;
- send, by the BIOS firmware, the second hash value to the EC firmware; and
- when the EC firmware determines that the second hash value matches a second reference hash value, send, by the EC firmware, a second confirmation to the BIOS firmware that the second hash value is accepted.

12. The information handling system of claim 11, wherein the first request specifies a first memory range associated with the EC firmware for calculating the first hash value, and wherein the second request specifies a second memory range associated with the BIOS firmware for calculating the second hash value.

13. The information handling system of claim 12, wherein the first memory range and the second memory range are unique to both a first version of the EC firmware and a second version of the BIOS firmware.

14. The information handling system of claim 12, wherein the first instructions and the second instructions are further executable to:
- repeat sending, by the BIOS firmware, the first request specifying the first memory range, wherein each repeated first request specifies a different value for the first memory range; and
- repeat sending, by the EC firmware, the second request specifying the second memory range, wherein each repeated second request specifies a different value for the second memory range.

15. The information handling system of claim 14, wherein the first memory range specified by a repeated first request overlaps with the first memory range specified by a previous first request, and wherein the second memory range specified by a repeated second request overlaps with the second memory range specified by a previous second request.

16. The information handling system of claim 11, wherein the first reference hash value is stored in a first file accessible to the BIOS firmware, and wherein the second reference hash value is stored in a second file accessible to the EC firmware.

17. The information handling system of claim 11, wherein the BIOS firmware is stored in a first non-volatile memory accessible to the processor subsystem, and wherein the EC firmware is stored in a second non-volatile memory accessible to the second processor.

18. The information handling system of claim 11, further comprising first instructions to:
- responsive to receiving the second indication, boot the information handling system.

19. The information handling system of claim 11, when the BIOS firmware determines that the first hash value does not match the first reference hash value, or when the EC firmware determines that the second hash value does not match the second reference hash value, further comprising first instructions to:
- restrict access to a hardware component included in the information handling system.

20. The information handling system of claim 19, wherein the hardware component is selected from at least one of:
- a network interface controller
- a storage controller;
- a system bus;
- a memory device;
- a storage device;
- a camera; and
- a microphone.

* * * * *